Nov. 20, 1962    R. E. AINSLIE ET AL    3,064,568
STABILIZED LINE DISPENSING DEVICE

Filed Aug. 15, 1956    5 Sheets-Sheet 1

INVENTORS
ROBERT E. AINSLIE
PAUL COMISAROW
BLANCHARD S. HUTCHINS
SAMUEL V. ZINN, JR.
BY
ATTORNEYS

Nov. 20, 1962    R. E. AINSLIE ET AL    3,064,568
STABILIZED LINE DISPENSING DEVICE
Filed Aug. 15, 1956    5 Sheets-Sheet 2

INVENTORS
ROBERT E. AINSLIE
PAUL COMISAROW
BLANCHARD S. HUTCHINS
SAMUEL V. ZINN, JR.
BY
ATTORNEYS

Nov. 20, 1962  R. E. AINSLIE ET AL  3,064,568
STABILIZED LINE DISPENSING DEVICE
Filed Aug. 15, 1956  5 Sheets-Sheet 3

INVENTORS
ROBERT E. AINSLIE
PAUL COMISAROW
BLANCHARD S. HUTCHINS
SAMUEL V. ZINN, JR.
BY
ATTORNEYS

Nov. 20, 1962   R. E. AINSLIE ET AL   3,064,568
STABILIZED LINE DISPENSING DEVICE
Filed Aug. 15, 1956   5 Sheets-Sheet 4

INVENTORS
ROBERT E. AINSLIE
PAUL COMISAROW
BLANCHARD S. HUTCHINS
SAMUEL V. ZINN, JR.
BY
ATTORNEYS

Fig. 9

United States Patent Office
3,064,568
Patented Nov. 20, 1962

3,064,568
STABILIZED LINE DISPENSING DEVICE
Robert E. Ainslie, Glenside, Paul Comisarow, Dresher, and Blanchard S. Hutchins, Warrington, Pa., and Samuel V. Zinn, Jr., Medford Lakes, N.J., assignors to the United States of America as represented by the Secretary of the Navy
Filed Aug. 15, 1956, Ser. No. 604,292
17 Claims. (Cl. 102—4)
(Granted under Title 35, U.S. Code (1952), sec. 266)

The invention described herein may be manufactured and used by or for the Government of the United States of America for governmental purposes without the payment of any royalties thereon or therefor.

The present invention relates to a stabilized line dispensing device and more particularly to a device capable of sequentially being dropped from an airplane in flight and dispensing line charges up to 300 feet and more in length which will fall into a given target area while in a fully extended attitude.

Previous devices for exploding paths through mine fields required personnel to approach the mined area and carry out a procedure which was highly susceptible to interference by opposing forces. These devices are especially disadvantageous when the mined or otherwise obstacled area is a beach and surprise is an important element in the assault.

The present invention utilizes airborne apparatus which when properly carried and dropped into a target area will quickly and efficiently blow a path therethrough. It utilizes an explosive line charge coiled up in an airborne container which upon release from an altitude of about 500 feet begins to dispense the line charge. The line charge is provided with an arrangement of parachutes for maintaining the charge in an extended position during its fall and landing in the given target area for insuring proper blasting.

An object of the present invention is to provide aerial dropped apparatus for exploding a path through a mined area.

Another object is the provision of aerial apparatus for dropping a line charge from an airplane into a given area so that said line charge lands fully extended in said area.

A further object is the provision of a novel arrangement for attaching an elongated member to one or more parachutes.

A further object is to provide an extended line charge or other articulated longitudinally extending element and means for dispensing same aerially for free flight while maintaining an extended attitude.

Another object of the invention is the provision of aerial apparatus for maintaining a line of up to 300 feet in length in a straight and extended attitude during free fall.

A further object is to provide apparatus for containing and dispensing line charges of up to 300 feet in length while in flight.

A final object of the present invention is the provision of apparatus for delivering by air a longitudinally extended line charge into a mined area for clearing a path therethrough.

The exact nature of this invention as well as other objects and advantages thereof will be readily apparent from consideration of the following specification relating to the annexed drawings in which.

Figure 1:
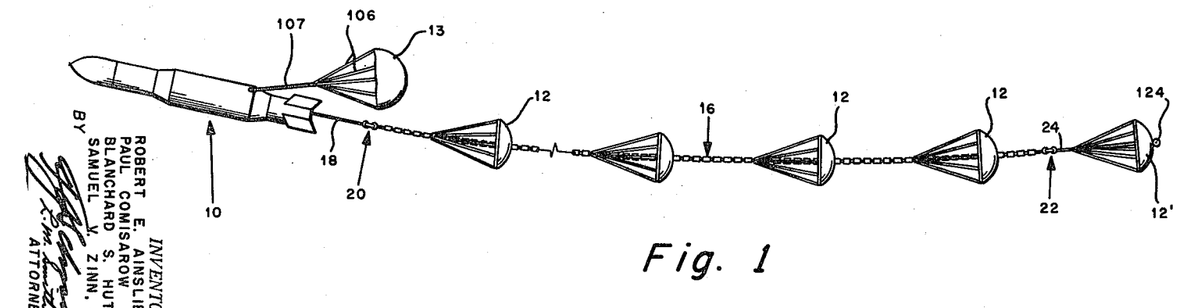
FIG. 1 shows the line dispensing device in its position in free flight with the line charge fully extended.

FIG. 1 illustrates line dispensing container 10 in free flight with line charge 16 fully extended and parachutes 12 and 12′ mounted thereon. Container 10 maintains a nose-up position during its fall through space because of the action of a pair of parachutes 13, explained further below. The rear of container 10 is shown without its tail cone since the latter is discarded before release of line charge 16. Line charge 16 extends from the rear outlet of container 10 and is connected to the interior of the latter at its front end by a tie line, cord, or rope 18.

Line 18 and line charge 16 are connected by a mechanical linkage 20. The rear of line charge 16 is connected by linkage 22 with a leader rope 24 having a release parachute 12′. Rope 24 terminates in a metal bushing 124 serving a purpose to be described further below. Parachutes 12 mounted along the length of line charge 16 are equi-spaced and are mounted with charge 16 passing through central openings in the parachute canopies. These parachutes provide proper braking action so that during the fall of container 10 with line 16 extending therefrom, the latter will land in a fully extended attitude and permit an elongated explosive effect in the designated target area.

Figure 2:
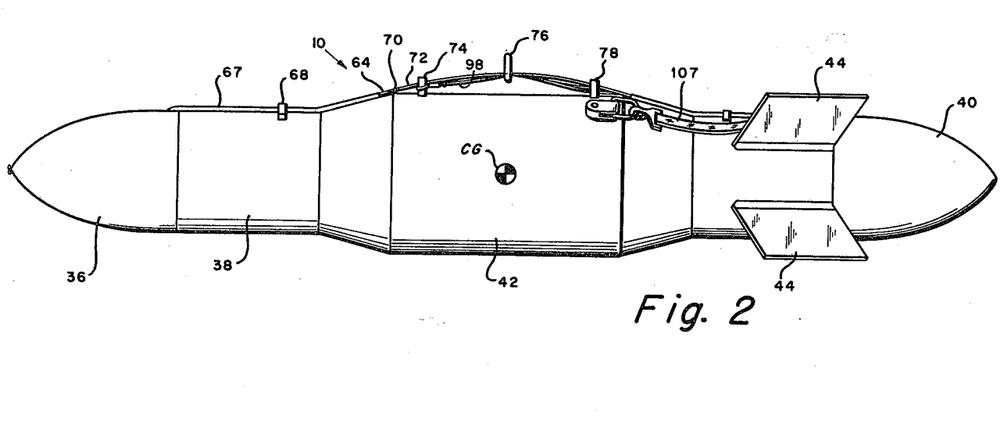
FIG. 2 shows a side elevation view of the dispenser.
Figure 3:
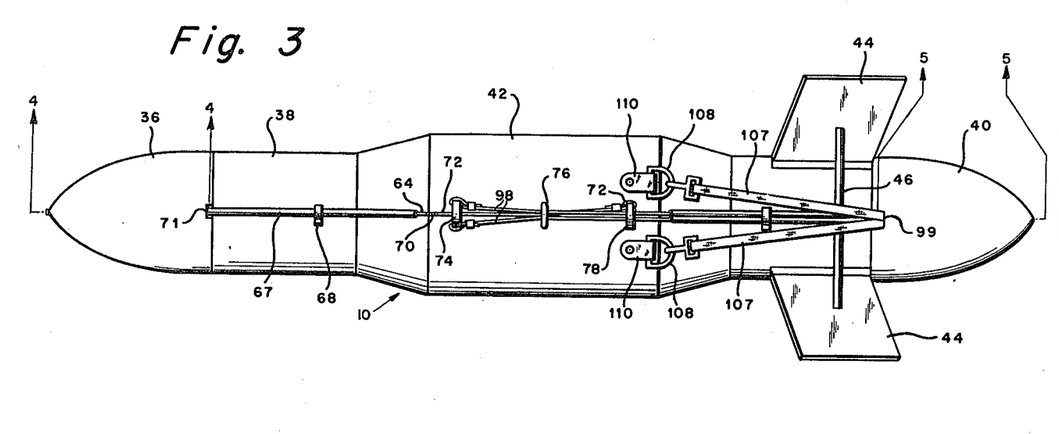
FIG. 3 is a top elevation of the dispenser of FIG. 2.
Figure 4:
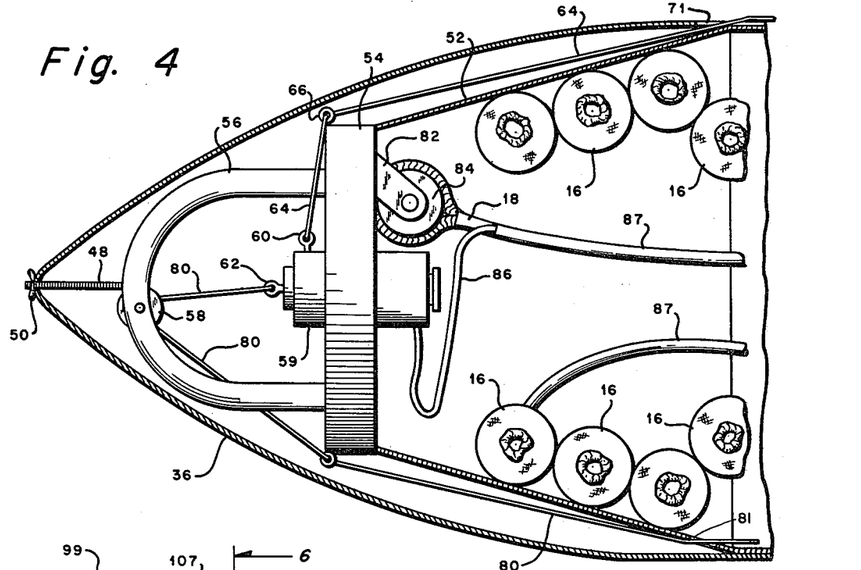
FIG. 4 is an enlarged sectional view along line 4—4 of FIG. 3.

FIGS. 2 and 3 show container 10 having line charge 16 wrapped therein and ready for mounting aboard the releasing aircraft (not illustrated). FIG. 4 shows a portion of the line charge winding in the interior of container 10. Returning to FIGS. 2 and 3, container 10 is formed of a removable nose section 36, a main body section 38 and a removable faired tail section or cone 40. Central section 38 has a central bulged portion 42 for structural purposes. Mounted along the rear of central section 38 are four fins 44, which serve the function of maintaining a general axial alignment of container 10 during the period immediately following the drop from the aircraft to prevent container 10 from coming into contact with any portion of the aircraft, and also a general, proper orientation during free fall. A pair of structural members 46 joining fins 44 provide structural rigidity.

Nose element 36 is a faired container covering the front of container 10 and is locked in place by the use of a threaded bolt 48 and a wing nut 50, as best shown in FIG. 4. Central section 38 has a diverging front end 52 terminating in an opening crossed by a transverse mounting frame 54 which provides mounting support for several elements to be described. When mounted, nose 36 fits over diverging end 52 flush with central section 38 to prevent an aerodynamic outside surface to the free air stream. A rounded or bent tie rod 56 carrying threaded bolt 48 is welded or otherwise connected to mounting frame 54.

Mounted on rod 56 is a pulley wheel 58 for a purpose to be described later. Also mounted on frame 54 is fuze 59 for line charge 16 having a pair of safety pins 60 and 62. Pin 60 is tied to a cable 64 which passes through a small loop 66, a sleeve 67 and a loop 68 to a destructible joint 70, FIGS. 2 and 3. Nose element 36 is provided with an opening 71 for the passage of cable 64. Joint 70 is connected at its opposite end to a cable 72 which passes through bracket 74 and an arming wire loop or ring 76 to a bracket 78 where it is tied permanently in any well known fashion.

When dispensing container 10 is mounted under the wing or fuselage of an airplane, it is held in place by brackets 74 and 78. A hook (not shown) mounted on the fuselage of the carrying craft is designed for passage through the loop or ring 76. When container 10 is released at brackets 74 and 78 this hook stays in engagement with loop 76 as container 10 drops away. Loop 76 and thereby cable 72 are lifted, resulting in pin 60 being pulled out of fuze 59. Pin 60 becomes caught on loop 66 causing destruction of section 70 and permitting the free end of wire 72 to slide through bracket 74 and ring 76, helping to free container 10 completely from the craft. The purpose of this arrangement, of course, is to perform the first step in arming fuze 59 after container 10 is released from the carrying aircraft. The other safety pin 62 mounted in fuze 59 is connected to a cable 80 passing over pulley 58 through opening 81 of diverging section 52 and the length of container 10 and attached to some convenient portion of line charge 16 which is pulled out of the rear of container 10 in a manner to be described below. Safety pin 62 insures that the line charge will not be armed until and unless line charge 16 actually is in the process of leaving container 10. As a safety measure, fuze 59 is designed so that pin 62 will arm the former only if pin 60 has been removed first.

Also mounted on mounting frame 54 is a link 82 which supports a bushing 84 upon which terminates the tie cord 18. Connected between tie cord 18 and fuze 59 is a fuze wire 86 passing through a sleeve 87 surrounding rope 18 leading to line charge 16. Line charge 16 is shown as coiled in the forward end of container 10 and this coiling, although not illustrated, is continued for the whole length of container 10 in order to accommodate approximately 300 feet of line charge and a plurality of parachutes 12 which are equi-spaced along the length of the former.

Figure 5:
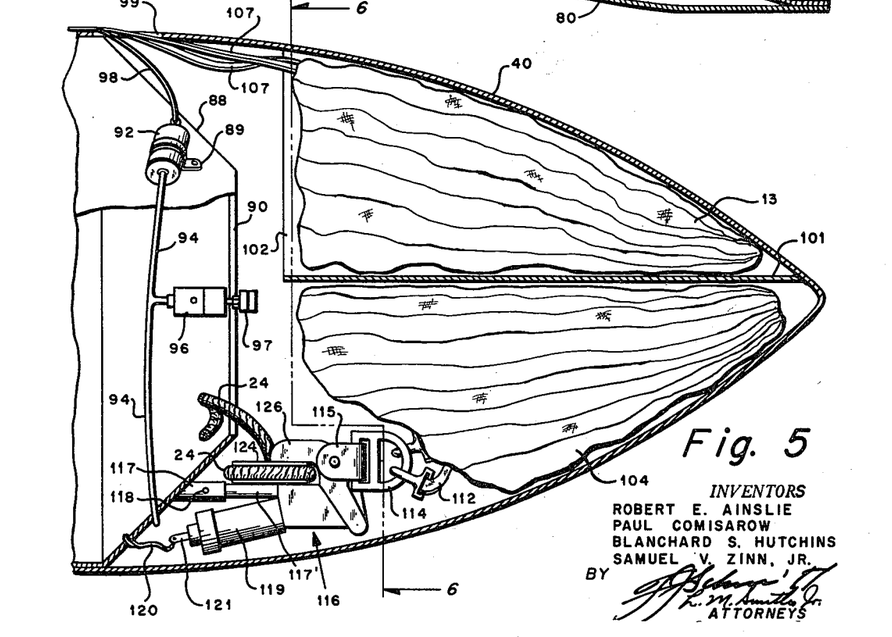
FIG. 5 is an enlarged sectional view along line 5—5 of FIG. 3.

As best shown in FIG. 5, container 10 terminates in a removable, faired tail cone 40 which slips over a frusto-conical section 88 having an exit 90 forming the rear outlet of container 10. Mounted on section 88 by brackets 89 are a pair of initiators 92 which are connected by a gas line 94 to deliver the high pressure gas from initiators 92 to a pair of ejector mechanisms 96 acting on bracket 97 mounted on tail cone 40 to release and eject sequentially tail cone 40 away from container 10. Ejection mechanism 96 is the subject matter of Patent No. 2,882,862, issued April 21, 1959, entitled "Tail Cone Release and Ejection Mechanism," by Charles A. Waldorff and Robert E. Ainslie. A pair of cables 98 passing through an opening 99 in tail cone 40 actuate initiators 92 when container 10 is released from the carrying aircraft. Cables 98 are terminated at their opposite ends at bracket 74 as shown in FIG. 2 and are pulled by the action of arming loop 76 in a manner similar to that of arming wire 72. Cables 98 may also be provided with destructible sections as are cables 64 and 72.

Figure 6:
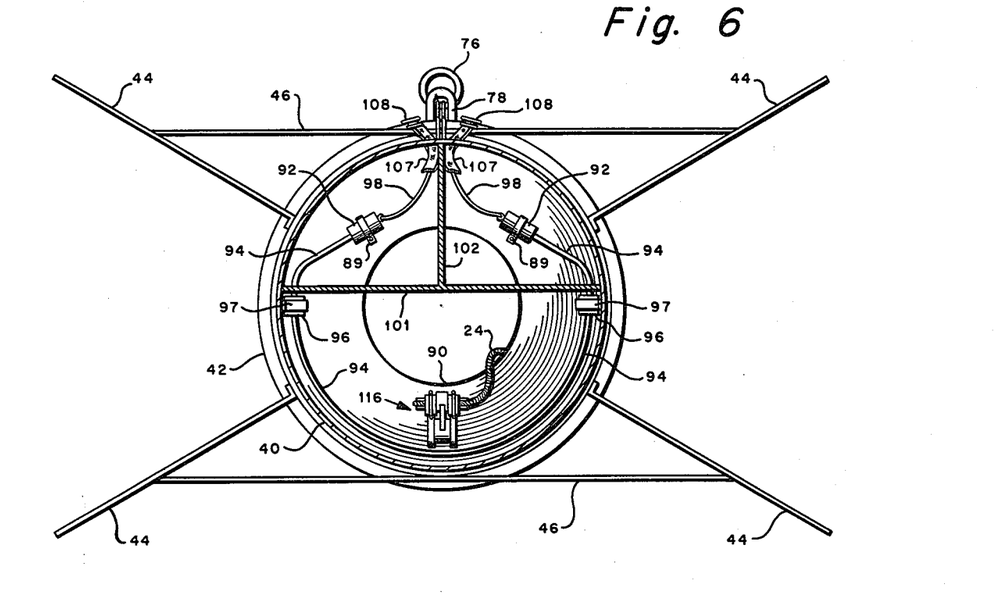
FIG. 6 is a sectional view of reduced size along line 6—6 of FIG. 5.

As best shown in FIGS. 5 and 6, tail cone 40 is divided into three sections by a pair of panels 101 and 102 forming a member. In the two top cavities formed by vertical partition 102, parachutes 13 are folded therein. In the larger bottom cavity, below partition 101, is a folded parachute 104. Parachutes 13 are connected through their shroud lines 106, FIG. 1, to a pair of riser belts 107 and buckles 108 terminating in bracketed straps 110 mounted on top of container 10. When tail cone 40 is released, parachutes 13 are whipped out by the airstream and inflated, thereby extending out in the manner illustrated in FIG. 1.

Parachute 104, FIG. 5, is connected through shroud lines 112 to a buckle 114 and strap 115 which are part of delay release mechanism 116. Delay release mechanism 116 forms the subject matter of Patent No. 2,828,997, issued April 1, 1958, entitled "Delay Release for Parachutes" by Charles A. Waldorff and Robert E. Ainslie. Mechanism 116 includes an initiator 119 for a purpose to be described below. A hollow sleeve 117 mounted on frusto-conical section 88 supports the release mechanism 116 by way of a rodlike extension 117' fitting therein. A destructible pin 118 maintains release 116 in sleeve 117. When tail cone 40 is ejected, parachute 104 is whipped out by the airstream and yanks delay release 116 from supporting sleeve 117 by shearing the pin 118. A cable 120 tying actuating pin 121 to conical section 88 sets off the delay mechanism of initiator 119 by pulling said pin 121. Leader rope 24 is looped around bushing 124 engaged with hook 126 in said release 116. Initiator 119, after suitable delay, opens hook 126 thereby releasing bushing 124 which is attached to the end of leader rope 24. By this time, parachute 12' shown in FIG. 1, has been discharged from the rear opening of container 10 and supplies the drag necessary for continuing the discharge of the line charge 16 and its associated cordage. Parachute 104 which may be larger than parachutes 12 and 12', falls with mechanism 116 free of container 10 and away from the line dispensing apparatus.

Figure 7:
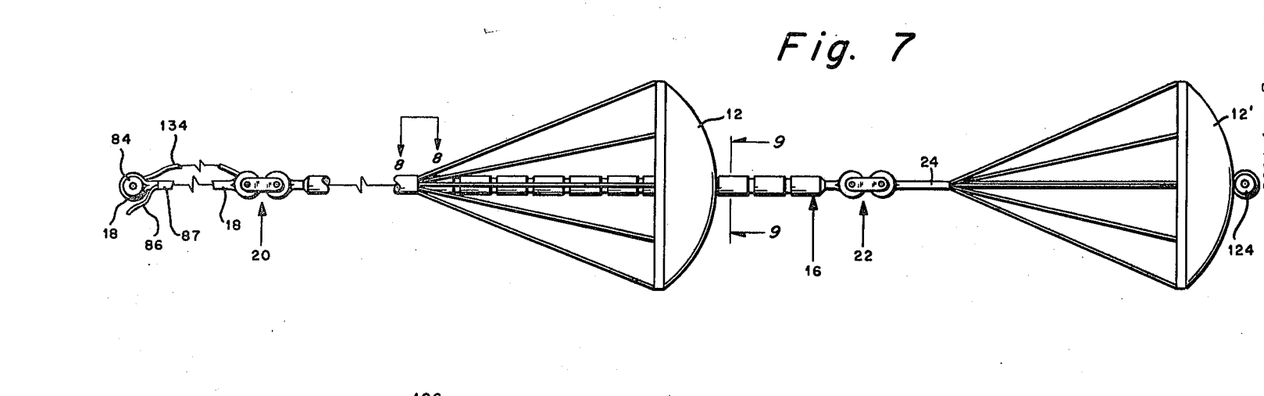
FIG. 7 shows details of the line charge.
Figure 8:
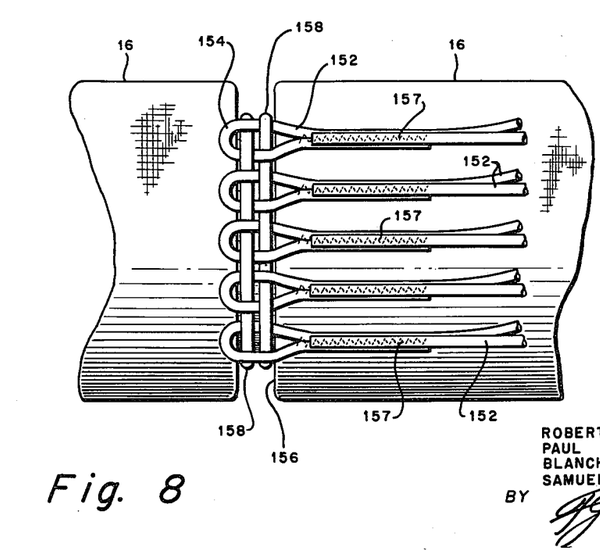
FIG. 8 is an enlarged view along line 8—8 of FIG. 7.
Figure 9:
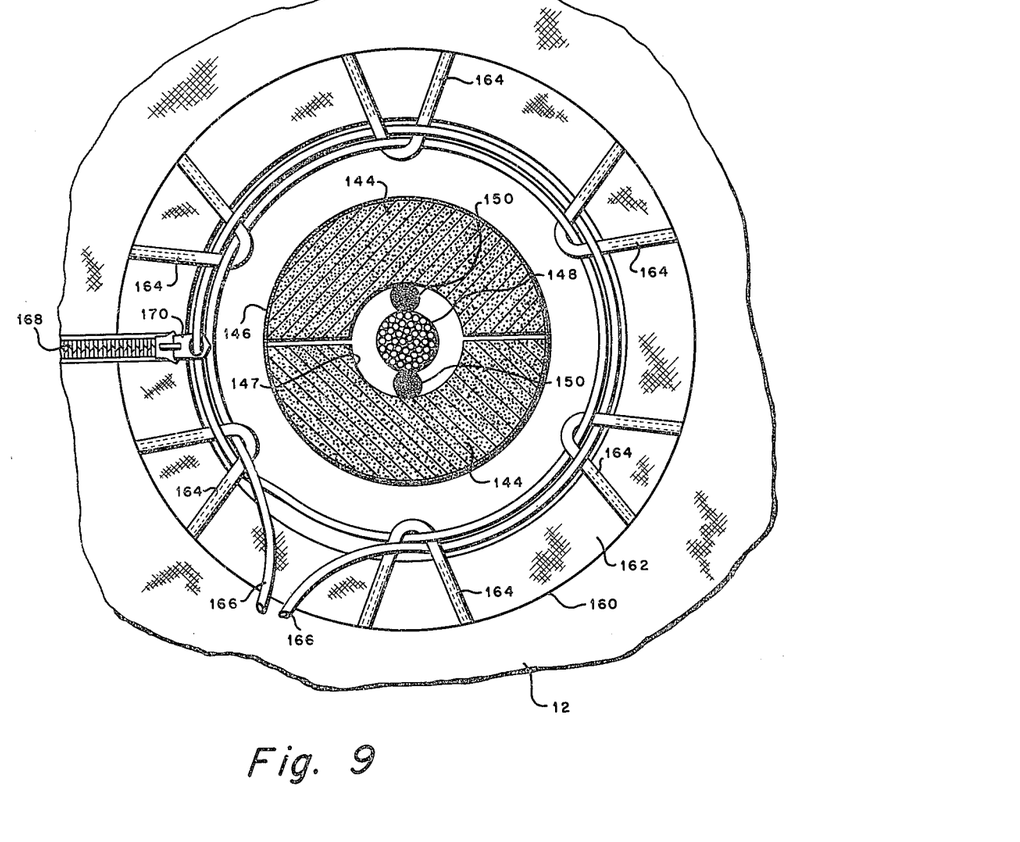
FIG. 9 is an enlarged sectional view along line 9—9 of FIG. 7.

The details of line charge 16 and the parachutes mounted thereon are shown in FIGS. 7, 8 and 9. Line charge 16 is provided at its forward and rear ends with connecting linkages 20 and 22, respectively. Tie rope 18, which should be at least as long as the length of container 10 when extended, is terminated at its forward end around bushing 84 and at its rear end in linkage 20. A shock line 134, for a purpose to be explained below may also be used, and if so, is also tied at its ends to bushing 84 and linkage 20. Shock line 134 would be shorter in length than tie cord 18. Leader core 24, carrying leader parachute 12' is tied at its ends to linkage 22 and bushing 124.

Line charge 16 is composed of segmental portions 144 of explosive composition material, FIG. 9, placed together in semi-circular segments and enclosed in heavy duty nylon covers 146. The composition segments 144 have an opening 147 providing for a central nylon core 148 and detonating cords 150, at least in the forward portion of line charge 16.

FIGS. 8 and 9 show how parachutes 12 spaced at equal intervals along charge 16 may be attached. Every other shroud line 152 is terminated in a loop 154 in the annular groove 156 formed between adjacent segments of line charge 16. Loops 154 are circumferentially arranged in groove 156 while the ends of the other shroud lines 152 are brought to complete the loops by stitching 157. One or more heavy duty nylon cords 158 are then passed through loops 154 and tied or clamped in any known fashion, thereby locking shroud lines 152 in place. The canopy of each parachute 12 is provided with a central opening 160 and an annular skirt 162 therein for supporting a plurality of rope loops 164 sewed in with skirt 162 to the canopy. A heavy duty nylon cord 166 pulled once or twice through loops 164 insures that the canopy is locked in place, preferably in the annular groove between segments of line charge 16. An opening closable with a zipper 168 in the canopy extending through skirt 162 to the outer canopy edge permits easy mounting of parachutes 12. Zipper pull 170 may be locked in place by pulling cord 166 through an opening therein. The ends of cord 166 may be tied or locked together in any known manner.

The operation of the line dispensing apparatus described above is as follows:

Container 10 housing the coils of line charge 16 is releasably mounted at brackets 74 and 78 to the underside of the fuselage or wing of the aircraft delivering said device. Loop 76 carrying cables 72 and 98 therethrough is attached to a hook (not illustrated) under said aircraft. When by appropriate means it is desired to drop the line dispensing device, the pilot or other designated person releases the hooks holding brackets 74 and 78. As container 10 drops away from the aircraft, the hook (not shown) on the aircraft engaging with loop 76 retains cables 72 and 98, thereby slipping safety pin 60 out of fuze 59 and igniting initiators 92. When pin 60 becomes caught on eye 66, destructible section 70 releases cable 72 which slips through bracket 74 and loop 76. Cables 98 slip through bracket 78 and ring 76, thereby completely releasing container 10 from the aircraft.

At the instant of release, said initiators 92 develop a large volume of fluid under pressure. The gases are passed through tubes 94 to the ejection mechanisms 96 which both release and positively eject tail cone 40 to the rear and away from container 10. Immediately following this action, parachutes 13 and parachute 104 become caught in the slip stream and become fully engaged. Parachutes 13 act to brake container 10 from the point where brackets 110 are rigidly connected to the top of container 10, just to the rear of the center of gravity of the device. This will insure that container 10 will ride in a nose-up position during the descent. This is desirable because fuze 59 in container 10 should not be detonated before line charge 16 is fully engaged with the ground, in order to obtain most efficient blasting. Parachute 104 upon being pulled free by the slip stream, disengages parachute release 116 from sleeve 117 after shearing pin 118 and unravels leader line 24 from the rear of container 10. During this process, cord 120 yanks detonating pin 121 from initiator 119, setting in motion the time delay for release mechanism 116. After the predetermined delay expires, which is sufficient for leader rope 24 and parachute 12' to become free of container 10, release mechanism 116 acts to free leader rope 24 from mechanism 116 and parachute 104, the latter two components both dropping away fully out of engagement with the dispensing apparatus. As container 10 continues its flight and descent, the slip stream acting on parachute 12' forces unwinding of line 16 with its parachutes 12 mounted thereon. Cable 80, which is connected to safety pin 62 on fuze 59 at one end and to some convenient point on line charge 16 at its other end, releases pin 62 as line charge 16 is dispensed, and fuze 59 becomes fully armed thereby. When line charge 16 is fully extended, shock line 134 absorbs the shock by breaking. Tie cord 18 is then easily capable of absorbing the remaining shock and holding line charge 16 in connection with container 10 during the remainder of their descent together.

When all the lines become fully extended, container 10 and line charge 16 assume the attitude shown in FIG. 1. Container 10 is the last member to settle to the ground, and fuze 59 after a suitable time delay following release of container 10 from the aircraft, detonates the explosive segments of line charge 16. In this manner, the explosion produced is most effective in blasting an extended path or ditch through any obstacled area, and detonating any live ground mines which may exist in the area.

In summary, the device described above provides for a line charge or other line element to be delivered by air to ground in a given target area in such a manner that a line up to 300 ft. in length may be landed fully extended in order to blow a path through a mine field or other obstacled area.

While the novel arrangements have been described in connection with the dispensation of line explosive charges for military use, it is apparent that they may have broader application to dispensing generally and for landing extended elements for other more general purposes, as for example, laying communications cable or making topographical studies.

Since certain changes in this invention may be made without departing from the spirit and scope thereof. It is intended that all matters contained in the foregoing description and shown in the accompanying drawings shall be interpreted as illustrative and not in a limiting sense.

What is claimed is:

1. An in-flight dispensing container comprising, a cylindrical body of aerodynamic shape having a tubular central section, a streamlined nose portion, and an ejectable tail cone, means on said container for support and release thereof in flight, vanes mounted on said tubular central section for providing proper orientation of said container during flight after said release, parachute means mounted along the top of said container immediately aft of the center of gravity of said container for causing a slowed descent of said container in a nose-up attitude following said release, and automatic means for ejecting said tail cone to permit dispensing.

2. A releasable airborne in-flight dispensing container comprising, a cylindrical body of aerodynamic shape having a tubular central section, a streamlined nose portion, and an ejectable tail cone, means on said central section carrying said container in normal flight position, vanes mounted on said tubular central section for stabilizing said container during flight, parachute means mounted along the top of said container immediately aft of the center of gravity of said container for causing a slowed descent of said container in a nose-up attitude following said release, and means associated with said carrying means for causing ejection of said tail cone upon release of said container to dispense from said container in flight.

3. A releasable airborne container for in-flight dispensing comprising, a cylindrical body of aerodynamic shape having a tubular central section, a streamlined nose portion, and an ejectable tail cone, means on said central section for causing said container to be carried aloft in normal flight position, vanes mounted on said tubular central section for stabilizing said container during flight, normally stowed parachute means having the shroud lines thereof connected along the top of said container immediately aft of the center of gravity of said container for causing a slowed descent of said container in a nose-up attitude following said release, means for causing ejection of said tail cone upon the release of said container in flight, said parachute means becoming unstowed in response to said ejection, and means actuated by ejection of said tail cone for beginning the in-flight dispensing action from said container.

4. A releasable container for in-flight dispensing comprising, a cylindrical body of aerodynamic shape having a tubular central section, a streamlined nose portion, and an ejectable tail cone, means on said central section for causing said container to be carried aloft in normal flight position, vanes mounted on said tubular central section for stabilizing said container during flight, normally stowed parachute means having the shroud lines thereof connected along the top of said container immediately aft of the center of gravity of said container for opening and slowing the descent of said container which assumes a nose-up attitude following said release means for causing ejection of said tail cone upon the release of said container in flight, said parachute means becoming unstowed in response to said ejection, and means actuated by ejection of said tail cone for beginning the in-flight dispensing from said container and subsequently disengaging said actuated means from said container after a predetermined time delay.

5. Line dispensing apparatus comprising, in combination, a line, a hollow dispensing container having an ejectable rear closure, said line being helically wound within said container and secured at one end to the interior of said container, initiator means attached to the opposite end of said line located adjacent said rear closure for causing initial dispensation of said line from said container in response to ejection of said closure, a plurality of means mounted on and spaced along said line for insuring the continued dispensation of said line after said initial dispensation, and means to eject said rear closure causing actuation of said initiator means, said spaced means also insuring that said line is maintained in a fully extended, substantially horizontal atttude during dispensing thereof.

6. The line dispensing apparatus of claim 5 in which said spaced means are parachutes.

7. Line dispensing apparatus comprising, in combination, a line, a hollow dispensing container having an ejectable rear closure, said line being helically wound within said container and secured at one end to the interior of said container, initiator means attached to the opposite end of said line located adjacent said rear closure for causing initial dispensation of said line from said container in response to ejection of said closure and including time delay release means for subsequently disengaging said initiator means from said line after a predetermined time delay, a plurality of means mounted on and spaced along said line for insuring the continued dispensation of said line after said initial dispensation, and means to eject said rear closure causing actuation of said initiator means, said spaced means also insuring that said line is maintained in a fully extended, substantially horizontal attitude during dispensing thereof.

8. Line dispensing apparatus comprising, in combination, a line, a hollow dispensing container having an ejectable rear closure, said line being helically wound within said container and secured at one end to the interior of said container, initiator means including a parachute attached to the opposite end of said line located adjacent said rear closure for causing initial dispensation of said line from said container in response to ejection of said closure, a plurality of parachute means mounted on and spaced along said line for insuring the continued dispensation of said line after said initial dispensation, and means to eject said rear closure causing actuation of said initiator means, said spaced means also insuring that said line is maintained in a fully extended, substantially horizontal attitude during dispensing thereof.

9. Airborne apparatus for clearing a path through a field of land mines comprising, a hollow dispensing container of aerodynamic design having vanes for insuring proper orientation during free flight, a line charge secured at one end to the interior of said container and a free end tied to a release parachute, said line charge being provided with a plurality of spaced parachutes along its length and being initially coiled within said container with said release parachute in the rear-most portion of said container, and means to open the rear of said container when said container is released in flight permitting said release parachute to initiate dispensation of said line charge during flight, said container and extending line charge falling with the latter trailing behind in substantially a horizontal attitude into a field of land mines.

10. The apparatus of claim 9 in which a detonator for said line charge is mounted within the nose of said container.

11. Airborne apparatus for clearing a path through a field of land mines comprising, a hollow dispensing container of aerodynamic shape having vanes for insuring proper attitude during free flight, a line charge secured at one end through a leader rope to the interior of said containe and secured through delay release means to a release parachute at its other end, said line charge being provided with a plurality of spaced parachutes along its length and initially coiled within said container with said release parachute in the rear-most portion of said container, and means to open the rear of said container when said container is released in flight permitting said release parachute to initiate dispensation of said line charge during flight, said delay release means disengaging said release parachute from said line charge a predetermined time and said container and said line charge being substantially coextensive and substantially horizontal when falling into the field of mines.

12. The apparatus of claim 11 in which a fore-shortened destructible shock cord is provided between said one end of said line charge and said interior of said container to absorb the shock of the unreeling drag load and prevent breakage of said leader rope.

13. Airborne apparatus for clearing a path through a field of land mines comprising, a hollow dispensing container of aerodynamic shape having vanes for insuring proper orientation during free flight, a line charge secured at one end to the interior of said container and a free end tied to a release parachute, said line charge being provided with a plurality of spaced parachutes along its length and initially coiled within said container with said release parachute in the rear-most portion of said container, and means consisting of an ejectable closure for opening the rear of said container when said container is released in flight and actuating said release parachute to initiate dispensation of said line charge during flight, said container and said line charge falling with the latter trailing behind the former in a substantially horizontal attitude into the field of land mines.

14. Airborne apparatus for clearing a path through a field of land mines comprising, a hollow dispensing container of aerodynamic shape having vanes for insuring proper orientation during free flight, parachute means secured to said container for maintaining a nose-up position during flight, a line charge secured at one end to the interior of said container and a free end tied to a release parachute, said line charge being provided with a plurality of spaced parachutes along its length and initially coiled within said container with said release parachute in the rear-most portion of said container, and means to open the rear of said container when said container is released in flight, permitting said release parachute to initiate dispensation of said line charge during flight, said container and said line charge falling with the latter trailing behind the former in a substantially horizontal attitude into the field of land mines.

15. In a ballistic weapon adapted to be carried by an aircraft, a cup-shaped faired nose section, a tubular intermediate section, a cup-shaped faired tail section, said intermediate section having frusto-conical ends adapted to telescope into said nose section and said tail section, a transverse mounting frame fixed to the forward end of said intermediate section, a U-shaped tie rod fixed to and extending forwardly of said mounting frame, a bolt carried by and extending forwardly of said tie rod and through the wall of said nose section, a nut threaded onto said bolt for securing said nose section to said intermediate section, a time-delay type fuze fixed to said mounting frame and having first and second safety pins, fastener means connecting said tail section to said intermediate section and including gas-initiated ejector means for unfastening and ejecting said tail section from said intermediate section, first initiator means having actuator pin means, conduit means interconnecting said first initiator means with said fastener means for conducting gas from said first initiator means to said fastener means for operating the same after said actuator pin means are pulled, first cable means connected to said actuator pin means and extending forwardly and exteriorly of said tail section and connected to a forward portion of said intermediate section, second cable means connected to said first safety pin and extending rearwardly and exteriorly of said nose section and connected to a rearward portion of said intermediate section and extending alongside of said first cable means, an arming wire having one end looped around said first and second cable means and the other end adapted to be connected to the aircraft for pulling said first safety pin and said actuator means upon the release of the ballistic weapon from the aircraft, destructible joint means in said first and second cable means for permitting the separation of said arming wire and said first and second cable means, line charge means having a plurality of explosive charges and small parachutes connected to a line, detonator wire means extending from said fuze along said line and connected to each of said explosive charges, said line charge means being stored within said intermediate section with one end of said line being connected to said mounting frame, third cable means connecting said second safety pin with an intermediate section of said line, panel means partitioning said tail section into three compartments opening towards said intermediate section, a first parachute disposed in a first one of said three compartments and having shroud lines, delay release mechanism means having said shroud lines connected thereto and having a latching portion latching the other end of said line of said line charge means thereto, shearable support means connecting said delay release mechanism means to said intermediate section, said shearable support means including a rearwardly extending sleeve fixed to said intermediate section, a forwardly extending rod fixed to said release mechanism means and telescopically disposed in said sleeve, and a transverse shear pin fastening said sleeve and said rod together, second initiator means connected to said delay release mechanism means and having an actuator means, fourth cable means connecting said actuator means of said second initiator means to said intermediate section in such a manner that upon said tail section being ejected said first parachute is separated from said intermediate section and said tail section and opened whereupon said shear pin is parted and said second actuator means is pulled thus causing the latching portion of said delay release mechanism means to be opened after a predetermined length of time and said first parachute is released from said line charge means and said intermediate section, and second and third parachutes stored in the second and third compartments of said three compartments, said second and third compartments being above said first compartment, said second and third parachutes each having a riser belt extending exteriorly and forwardly of said tail section and fastened to the exterior upper rear portion of said intermediate section back of and above the center of gravity of the ballistic weapon so that after said tail section is ejected said second and third parachutes will open and said nose and intermediate sections will fall in a nose-up attitude supported by said second and third parachutes, and said plurality of small parachutes being connected to said line charge means at spaced points for the purpose of supporting said line charge means in an extended trailing position behind said intermediate section so that said line charge means will be fully extended during the balance of the descent thereof.

16. In a ballistic weapon adapted to be carried by an aircraft, a cup-shaped faired nose section, a tubular intermediate section, a cup-shaped faired tail section, said intermediate section having frusto-conical ends adapted to telescope into said nose section and said tail section, a transverse mounting frame fixed to the forward end of said intermediate section, a U-shaped tie rod fixed to and extending forwardly of said mounting frame, a bolt carried by and extending forwardly of said tie rod and through the wall of said nose section, a nut threaded onto said bolt for securing said nose section to said intermediate section, fastener means connecting said tail section to said intermediate section and including gas-initiated ejector means for unfastening and ejecting said tail section from said intermediate section, first initiator means having actuator pin means, conduit means interconnecting said first initiator means with said fastener means for conducting gas from said first initiator means to said fastener means, first cable means connected to said actuator pin means and extending forwardly and exteriorly of said tail section and connected to a forward portion of said intermediate section, an arming wire having one end looped around said first cable means and the other end adapted to be connected to the aircraft for pulling said actuator means upon the release of the ballistic weapon from the aircraft, destructible joint means in said first cable means for permitting the separation of said arming wire and said first cable means, line means having one end connected to said mounting frame, said line means being stored within said intermediate section, panel means partitioning said tail section into three compartments opening towards said intermediate section, a first parachute disposed in a first one of said three compartments and having shroud lines, delay release mechanism means having said shroud lines connected thereto and having a latching portion latching the other end of said line means thereto, shearable support means connecting said delay release mechanism means to said intermediate section, second initiator means connected to said delay release means and having an actuator means, second cable means connecting said actuator means of said second initiator means to said intermediate section in such a manner that upon said tail section being ejected said first parachute is separated from said intermediate section and said tail section and opened whereupon said shearable support means is parted and said second actuator means is pulled thus causing the latching portion of said delay release mechanism means to be opened after a predetermined length of time and said first parachute is released from said line means after said line means has been partially payed out, second and third parachutes stored in the second and third compartments of said three compartments, said second and third parachutes each having a riser belt extending exteriorly and forwardly of said tail section and fastened to the exterior of the upper rear portion of said intermediate section back of and above the center of gravity of the ballistic weapon in such a manner that after said tail section is ejected said second and third parachutes will open and said nose and intermediate sections will fall in a nose-up attitude supported by said second and third parachutes, and a plurality of small parachutes connected to said line means at spaced points for the purposes of fully extending and supporting said line means in an extended trailing position behind said intermediate section.

17. In a ballistic weapon adapted to be carried by an aircraft, a cup-shaped faired nose section, a tubular intermediate section fixed to said nose section, a cup-shaped faired tail section, a time-delay type fuze fixed in said nose and intermediate sections and having first and second safety pins, fastener means connecting said tail section to said intermediate section and including means for unfastening and ejecting said tail section from said intermediate section, actuator means for operating said fastener means, first cable means connected to said actuator means and extending forwardly and exteriorly of said tail section and connected to a forward portion of said intermediate section, second cable means connected to said first safety pin and extending rearwardly and exteriorly of said nose section and connected to a rearward portion of said intermediate section and extending alongside of said first cable means, arming wire means looped around said first and second cable means and connected to the aircraft for pulling said first safety pin and operating said actuator means upon the release of the ballistic weapon from the aircraft, line charge means having a plurality of explosive charges connected to a line, detonator wire means extending from said fuze along said line and connected to each of said explosive charges, said line charge means being stored within said nose and intermediate sections and having one end connected thereto, third cable means connecting said second safety pin with an intermediate section of said line, a first parachute having shroud lines and disposed in said tail section, delay release means interconnecting said first parachute to the other end of said line, shearable support means connecting said delay release means to said intermediate section, said delay release means having actuator means connected to said intermediate section in such a manner that upon said tail section being ejected said first parachute is also separated from said intermediate section and said tail section and opened whereupon said shearable support means is parted and said actuator means operates said delay release means after a predetermined length of time whereupon said first parachute is released from said line charge means, second parachute means stored in said tail section and having a riser belt extending exteriorly and forwardly of said tail section and fastened to said intermediate section in such a manner that after said tail section is ejected said second parachute means will open and said nose and intermediate sections will fall in a nose-up attitude supported by said second parachute means and means connected to said line charge means at spaced points for the purpose of supporting said line charge means in an extended trailing position behind said intermediate section during descent.

References Cited in the file of this patent

UNITED STATES PATENTS

| | | |
|---|---|---|
| 1,207,520 | Fabiani et al. | Dec. 5, 1916 |
| 2,342,096 | Zimmerman | Feb. 15, 1944 |
| 2,368,258 | Manson et al. | Jan. 30, 1945 |
| 2,409,848 | Greulich | Oct. 22, 1946 |
| 2,771,841 | De Fino | Nov. 27, 1956 |
| 2,850,973 | Fisher et al. | Sept. 9, 1958 |

FOREIGN PATENTS

| | | |
|---|---|---|
| 120,788 | Great Britain | Nov. 28, 1918 |
| 561,665 | Great Britain | May 30, 1944 |
| 812,183 | France | Jan. 27, 1937 |
| 833,633 | France | July 25, 1938 |
| 857,812 | France | Apr. 29, 1940 |
| 865,827 | France | Mar. 17, 1941 |